May 23, 1950 A. H. STRONSTORFF 2,508,898
AIRCRAFT FLIGHT TIME AND MILEAGE COMPUTER
Filed Sept. 10, 1946 2 Sheets-Sheet 1
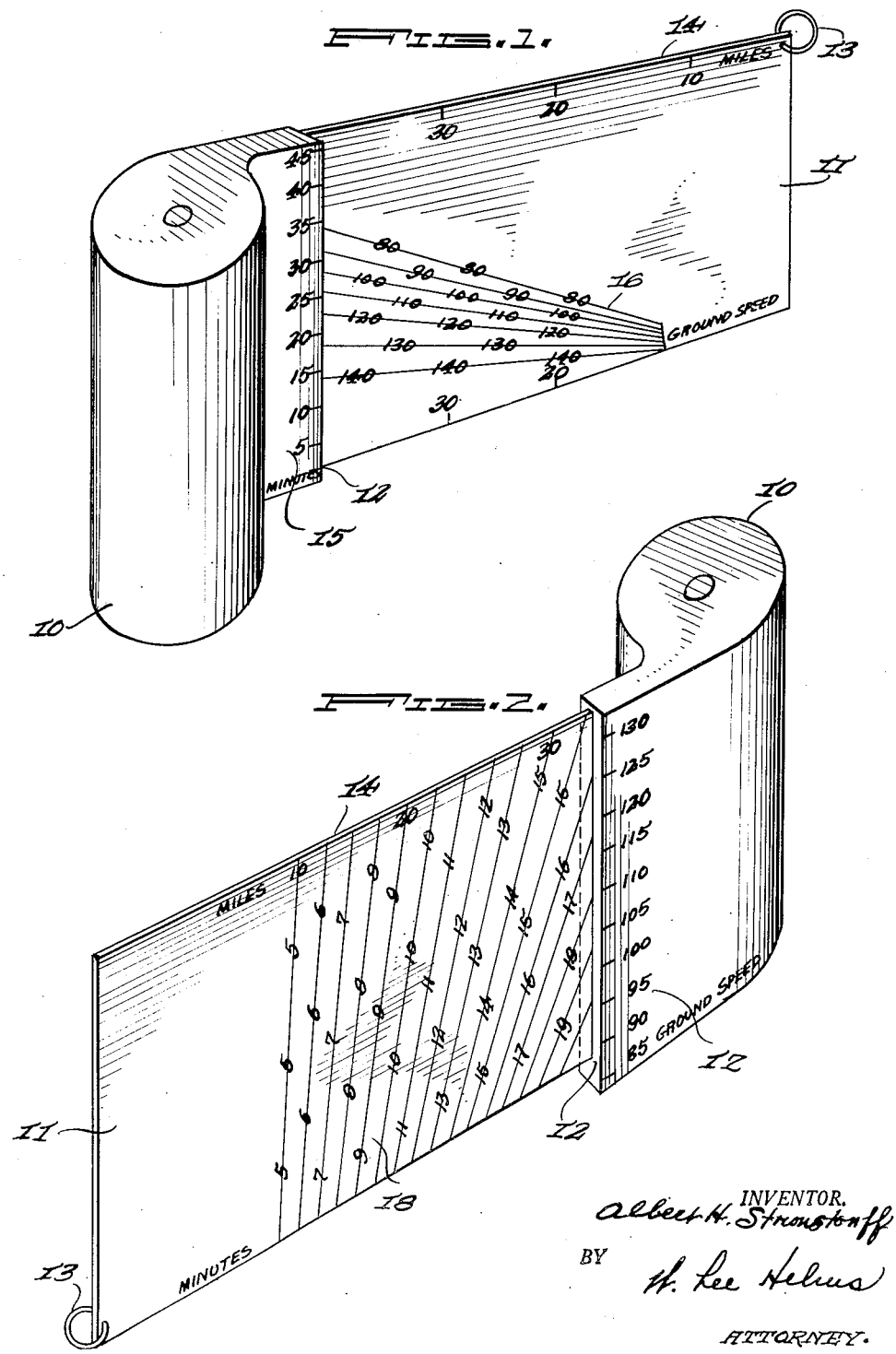
INVENTOR.
Albert H. Stronstorff
BY
W. Lee Helms
ATTORNEY.

May 23, 1950     A. H. STRONSTORFF     2,508,898
AIRCRAFT FLIGHT TIME AND MILEAGE COMPUTER
Filed Sept. 10, 1946     2 Sheets-Sheet 2
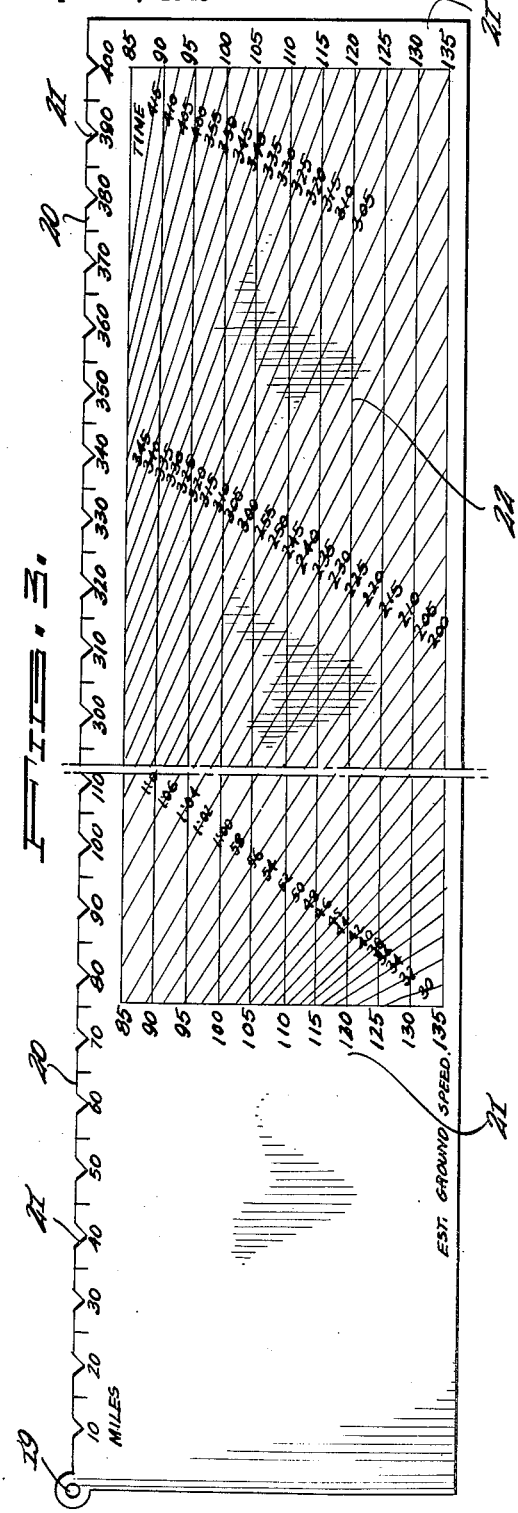
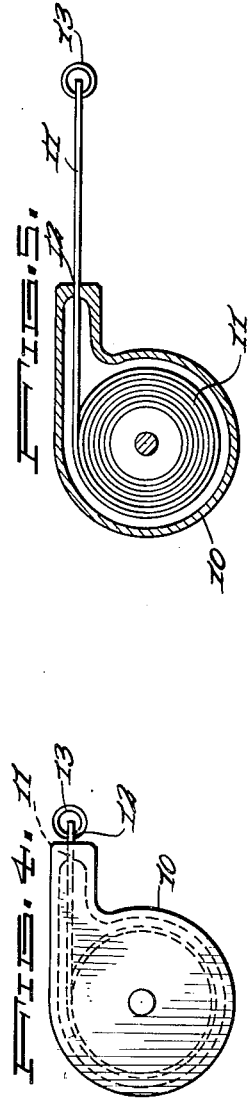
INVENTOR.
Albert H. Stronstorff
BY
W. Lee Helms
ATTORNEY.

Patented May 23, 1950

2,508,898

UNITED STATES PATENT OFFICE 2,508,898

AIRCRAFT FLIGHT TIME AND MILEAGE COMPUTER

Albert H. Stronstorff, Racine, Wis., assignor to Reynolds Metals Company, Richmond, Va., a corporation of Delaware Application September 10, 1946, Serial No. 695,847

1 Claim. (Cl. 235—61)

This invention relates to geometric computing instruments of the type having three or more scales, wherein the indication upon at least one scale is a function of the indications upon the remaining scales.

More particularly the invention relates to a computing instrument adapted for correlating the time, distance and speed of a moving object, such as an aircraft, so that the manual setting upon the instrument of two of these factors will automatically yield an indication thereupon of the third factor, mathematically derivable from the first two.

One object of this invention is to provide an instrument of the type described, of which a certain portion can be placed upon a predetermined point of a map, for example that corresponding to a fixed station, which can then be rotated around this point until one scale intersects a second point, representing the position of a mobile station, and which will then read a time interval directly upon a second scale, corresponding to a known speed of the mobile station, as represented on a third scale.

Another object of this invention is to provide a computing device for use in an airport, having the zero end of one scale pivoting about a point on a map, this point representing the airport location, a distance scale extending to another point representing the location of an airplane on the map, a second scale on which the known speed of the airplane is found, and a third scale upon which a value determined by the relationship of the first two scales indicates the elapsed flying time of the airplane.

A further object of this invention is to provide a computing instrument of the type just described in which the distance scale is provided with evenly spaced notches, to promote facility of determinations therealong.

Yet another object of this invention is to provide a computing instrument of the type solving a simple algebraic equation having one unknown quantity, wherein distance is marked upon a scale along one edge of a flexible extensible tape and either one of the factors, time or speed, are marked along a scale perpendicular to the tape, while the unknown factor is denoted upon a third scale comprising series of oblique lines extending along the surface of the tape, the geometrical intersection of the first two scales giving the solution of the equation upon the third scale.

A yet further object of this invention is to provide a computing instrument for use on an airplane or the like, in which a longitudinal distance scale, readily placed upon a map, extends along one edge of a tape, a second scale representing either speed or time extends along at least one lateral edge of the tape, and a third scale representing the third factor is plotted as oblique lines upon the surface of the tape.

Other purposes and advantages of this invention will be apparent from the following specification and from the hereunto annexed drawings, in which:

Fig. 1 shows an embodiment of one form of this invention,

Fig. 2 shows the rear side of the form of Fig. 1, constituting another form of this invention, Fig. 3 shows still another form of this invention, Fig. 4 is a side elevation of the form of Fig. 1, and Fig. 5 is a cross-sectional side elevation of the form of Fig. 1, showing the storage of the tape.

The forms of this invention shown in Figs. 1 and 2, may be combined in a single device, by utilizing the two sides of the same tape, and the same storage chamber.

In Fig. 1, a storage container 10, of any suitable type, contains a tape 11, rolled up therein by any suitable means (not shown). A slit 12, allows the ring 13, affixed to the end of the tape, to be grasped, so as to withdraw the tape until the free end thereof rests on one point upon a map, and the slit coincides with a second point upon the map, the distance between the points then being readable along scale 14. Scale 15, along the slit, is read for elapsed time, and the geometrical intersection of the two readings upon scale 16 shows the ground speed of a moving vehicle, such as an airplane.

Fig. 2 shows a variant form, similar elements being identically denoted, which may conveniently be located upon the rearward portion of the device of Fig. 1. In this case the speed is assumed to be known, and is located on scale 17, the flying time being readable on scale 18, comprising oblique lines, by geometrical intersection, as already described for Fig. 1.

In the embodiment shown in Fig. 3, the instrument is substantially non-flexible and is provided with an eyelet 19, adapted to be placed upon a suitable pivot located at the point upon a map representing the location of a fixed ground station. The instrument is pivoted about the point until scale 20 intersects another point upon the map, the notches 21 facilitating this.

Scale 20 then gives the distance between the two points. The known or estimated speed of a moving vehicle is determined upon scale 21, and the intersection of this latter scale and a perpendicular dropped from scale 20 will yield, upon scale 22, consisting of oblique lines, the desired indication of the time needed for the vehicle to traverse the distance between the two points upon the map.

Many advantages of this invention will be apparent to those skilled in the art. For example the notches may be used as marking guides to allow graphic indicia to be placed upon the map at even intervals.

While I have shown and described certain embodiments of my invention, it is to be understood that these are by way of example and not of limitation, and that the scope of this invention is limited only by the hereunto appended claim.

I claim:

A computing instrument for airplane use, including a flexible strip, a slotted container for enclosing the strip and from which the strip is extractable through the slot thereof, a first scale of ground speed extending along the margin of the container at its slot, the scale consisting of indicia indicating successive ground speeds, the strip at its top being marked with progressively spaced indicia indicating miles and the strip also being marked with transversely extending divisional lines, the lines being at relatively and progressively increased angles and each line being marked with a plurality of time indicia spaced vertically to accord with the ground speed scale on the margin of the container and correlating the miles and hence distance scale on the strip with said ground speed scale in terms of minutes of flight, as and for the purpose set forth.

ALBERT H. STRONSTORFF.

REFERENCES CITED

The following references are of record in the file of this patent:

UNITED STATES PATENTS

| Number | Name | Date |
|---|---|---|
| 1,205,811 | Taylor | Nov. 21, 1916 |
| 1,528,944 | Newell | Mar. 10, 1925 |
| 1,569,190 | Krupp | Jan. 12, 1926 |
| 1,930,478 | Jones | Oct. 17, 1933 |
| 2,179,531 | Trapnell | Nov. 14, 1939 |

FOREIGN PATENTS

| Number | Country | Date |
|---|---|---|
| 14,635 | Great Britain | 1898 |